(12) United States Patent
Kraus et al.

(10) Patent No.: US 8,117,710 B2
(45) Date of Patent: Feb. 21, 2012

(54) WINDSCREEN WIPER DEVICE, IN PARTICULAR FOR A MOTOR VEHICLE

(75) Inventors: Achim Kraus, Buehl (DE); Francois Schabanel, Saint Maux des Fosses (FR)

(73) Assignee: Robert Bosch GmbH, Stuttgart (DE)

( * ) Notice: Subject to any disclaimer, the term of this patent is extended or adjusted under 35 U.S.C. 154(b) by 1245 days.

(21) Appl. No.: 10/561,709

(22) PCT Filed: Apr. 27, 2004

(86) PCT No.: PCT/DE2004/000883
§ 371 (c)(1),
(2), (4) Date: Dec. 21, 2005

(87) PCT Pub. No.: WO2005/000645
PCT Pub. Date: Jan. 6, 2005

(65) Prior Publication Data
US 2006/0260085 A1    Nov. 23, 2006

(30) Foreign Application Priority Data
Jun. 30, 2003 (DE) .................... 10329266

(51) Int. Cl.
*B60S 1/04* (2006.01)
*B60S 1/06* (2006.01)

(52) U.S. Cl. .................... 15/250.31; 15/250.3; 248/900; 296/96.17; 403/DIG. 3

(58) Field of Classification Search .................. 15/250.3, 15/250.31, 250.27; 296/96.15, 96.17; 403/DIG. 3; 74/42, 43; 248/900
See application file for complete search history.

(56) References Cited

U.S. PATENT DOCUMENTS

| | | | | |
|---|---|---|---|---|
| 2,124,440 | A * | 7/1938 | Tallberg | .......................... 40/618 |
| 5,878,631 | A * | 3/1999 | Muehlpforte et al. | ...... 74/606 R |
| 6,505,376 | B1 | 1/2003 | Kagawa | |
| 6,672,814 | B1 | 1/2004 | Kotlarski | |
| 7,389,562 | B2 * | 6/2008 | Linden | ........................ 15/250.31 |
| 2005/0039290 | A1 | 2/2005 | Morin et al. | |

FOREIGN PATENT DOCUMENTS

| | | |
|---|---|---|
| DE | 199 03 140 | 9/1999 |
| EP | 0703128 | * 3/1996 |
| EP | 0 739 793 | 10/1996 |
| EP | 0 916 559 | 5/1999 |
| EP | 1033295 A2 | 9/2000 |
| EP | 1266810 | * 12/2002 |
| GB | 2 347 340 | 9/2000 |
| JP | 11124014 | 5/1999 |
| JP | 11217061 | 8/1999 |
| JP | 2000326833 A | 11/2000 |
| WO | 02/094622 A1 | 11/2002 |
| WO | WO 2004/037621 | 5/2004 |

* cited by examiner

*Primary Examiner* — Gary Graham
(74) *Attorney, Agent, or Firm* — Michael Best & Friedrich LLP (57) ABSTRACT

The invention relates to a windshield wiper device (10), in particular for a motor vehicle, comprising a support (12), on which a bearing (18) is arranged, which supports a wiper shaft (22). In this case, a retaining element (20) is provided, which detachably connects the bearing (18) to the support.

17 Claims, 7 Drawing Sheets

WINDSCREEN WIPER DEVICE, IN PARTICULAR FOR A MOTOR VEHICLE

BACKGROUND OF THE INVENTION

The invention relates to a windshield wiper device, in particular for a motor vehicle.

Numerous windshield wiper devices having a wiper shaft that is positioned in a bearing that is fastened on a support are already known, for example from DE-A 199 03 140. The wiper shafts are connected with wiper arms bearing the wiper blades and therefore project from the body of the motor vehicle. In the case of a pedestrian impact with the body of the motor vehicle, the pedestrian can be injured by these projecting wiper shafts. As a result, several methods have been developed to protect the pedestrian. Normally, the fastening of the windshield wiper device is provided with predetermined breaking points so that, in the case of an impact on the wiper shafts, the windshield wiper device can be torn from its fastening and descend into the interior of the body.

In this case, it is problematic first of all that adequate construction space has to be available to accommodate the windshield wiper device and, secondly, the entire windshield wiper device has to be replaced after a crash.

In addition, raising the engine hood in a crash is known so that contact with the wiper arms and wiper shafts is avoided. However, this is very costly and not practical for smaller vehicles.

SUMMARY OF THE INVENTION

The windshield wiper device in accordance with the invention has the advantage that a retaining element is provided, which detachably connects the bearing to the support so that, in the case of an increased effect of force on the wiper shaft, only the bearing is separated from the support and must disappear within the vehicle body. In this case, the windshield wiper device itself always remains in its original position, wherein firstly, construction space is saved and secondly, the windshield wiper device will not be destroyed in a crash.

It is especially advantageous if the support has a receptacle to accommodate the bearing. The receptacle guarantees a secure hold of the bearing on the support.

If the bearing includes a tube, it is advantageously easy to fasten it on the support and reliably support the wiper shaft.

In a particularly simple and therefore advantageous embodiment, the retaining element is embodied as a clip, which connects the bearing to the support. This type of clip can be replaced easily and can also be embodied so that it is reusable.

In this case, it is especially advantageous if the clip grips around the bearing at least partially in a radial fashion in order to achieve an especially good hold on the bearing.

If the support has an at least partially flattened area and if the bearing includes a plate that is fastened on the flattened area of the support, an especially stable and secure mounting of the bearing on the support is produced.

In this case, it is of particular advantage if the plate on the support is fastened via predetermined breaking elements.

Moreover, it should be viewed as advantageous if the bearing is accommodated in a guide of the support and the retaining element is embodied as a speed nut. In this way, speed nuts, which are available in large unit numbers as cost-effective series production parts, can be used as retaining elements.

If the guide has an inclined plane, the required force component, which leads to the speed nut being detached, can be adjusted precisely in its direction.

BRIEF DESCRIPTION OF THE DRAWINGS

Different exemplary embodiments of the invention are depicted in the drawings and explained in greater detail in the following description. The drawings show:

FIG. 9 Another variation of the bearing from FIG. 7a;

DETAILED DESCRIPTION OF THE EXEMPLARY EMBODIMENTS

Figure 1:
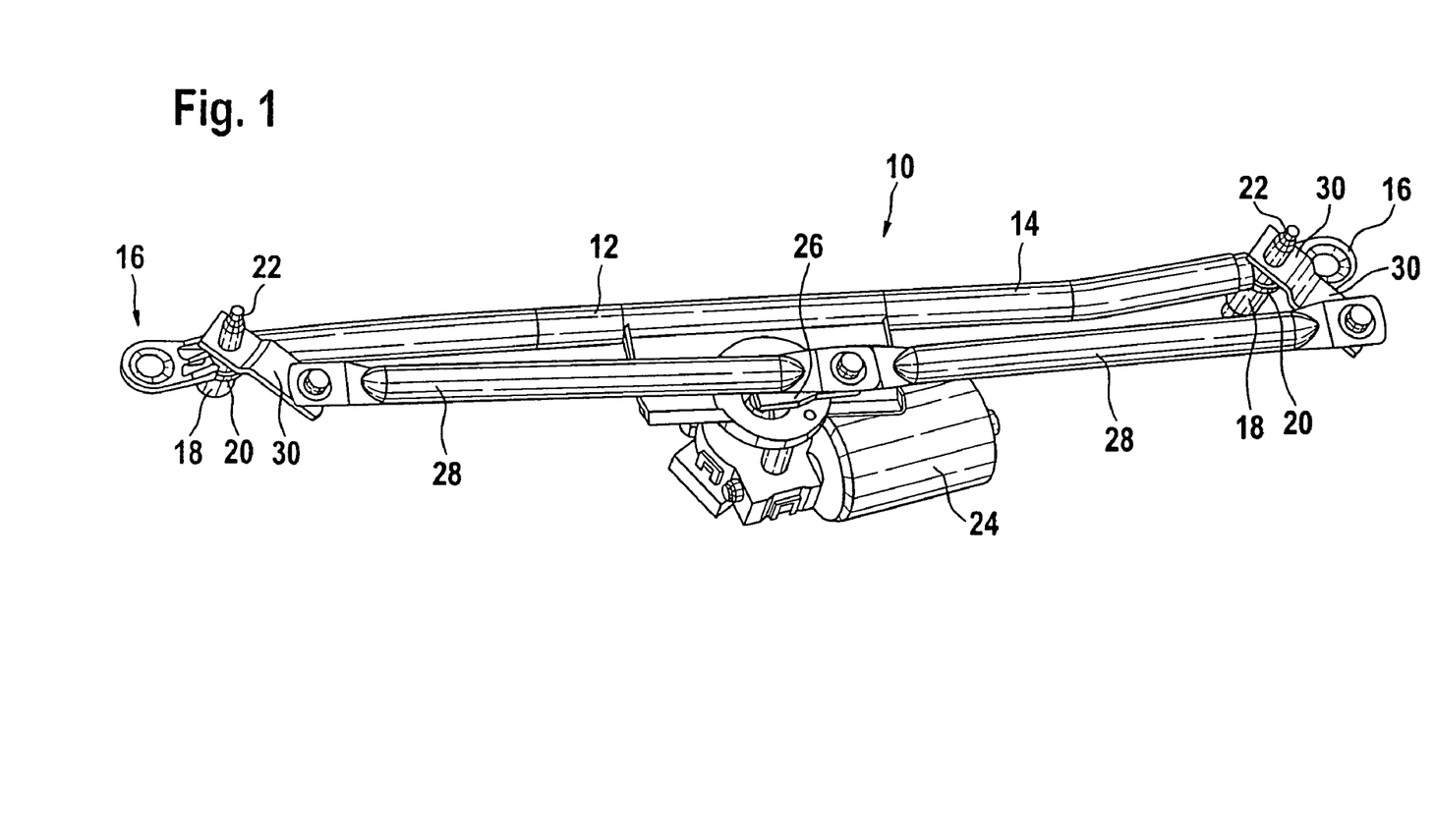
FIG. 1 A perspective representation of a windshield wiper device in accordance with the invention.

FIG. 1 depicts a perspective representation of a windshield wiper device 10 in accordance with the invention. It is comprised essentially of a support 12 made of a tube 14, and a bearing holder 16 is attached on each of its two ends. The bearing holders 16 of the support 12 each accommodate a bearing 18, which is fixed radially and axially by means of retaining elements 20 on the bearing holders 16 of the support 12. The bearing 18 support the wiper shafts 22, on which the wiper arms (not shown here) having wiper blades are fastened.

In addition, an electric motor 24 is attached as a drive device to the tube 14 of the support 12, and said electric motor is able to set the wiper shafts 22 into a pendulum motion via a crank mechanism. The windshield wiper device 10 is fastened to the body of the motor vehicle via the bearing holder 16 of the support 12. The drive device 24 drives a first crank 26, which is able to set the two thrust rods 28 into a back and forth motion. The ends of the thrust rods 28 facing away from the drive device 24 are connected in a movable manner to two cranks 30, which are in turn connected in a rotationally secured manner to the wiper shafts 22.

In one variation of the invention, naturally a mechanism other than a crank mechanism can also be provided or even only one wiper shaft can be driven by an electric motor, as is the case with modern two-motor wiper units.

Figure 2:
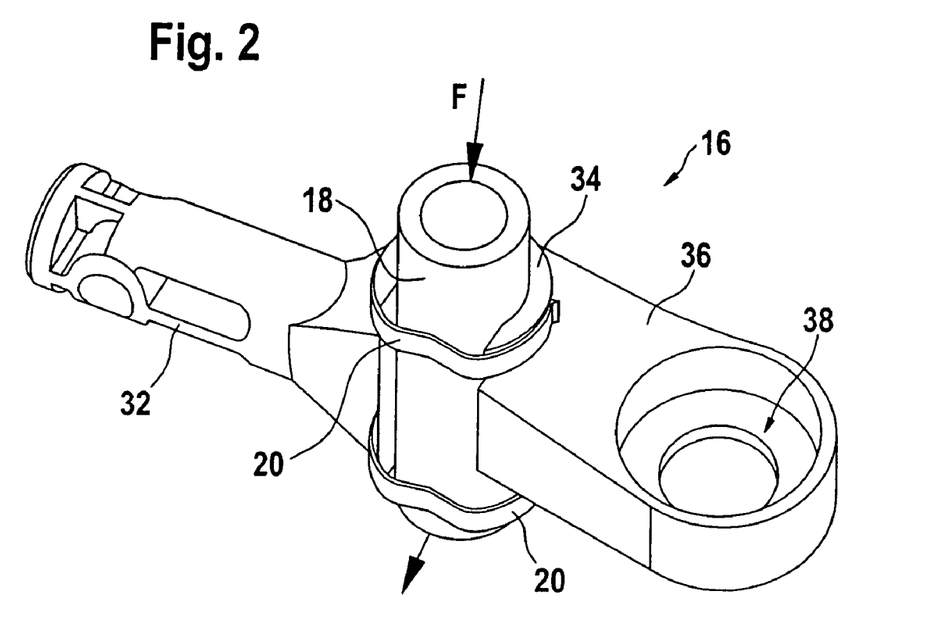
FIG. 2 A portion of a support with a bearing of a windshield wiper device in accordance with the invention in detail.

FIG. 2 shows a perspective representation of a bearing holder 16 of the support 12 of a windshield wiper device 10 in accordance with the invention. The bearing holder 16 essentially includes a fastening section 32, on which a receptacle 34 to accommodate the bearing 18 is attached, as well as an assembly section 36, which is used to fasten the support 12 to the body of the motor vehicle. The fastening section 32 has an essentially cylindrical form and is inserted and crimped in the tube 14 of the support 12. The receptacle 34 is essentially a longish element embodied in a C-shape in cross section, whose longitudinal extension extends approximately perpendicular to the longitudinal extension of the cylindrical fastening section 32. The bearing 18 that is essentially comprised of a tubular bushing is inserted into the interior of the C-shaped receptacle 34. The bearing 18 is fixed in the receptacle 34 by two bow-like clip elements as retaining elements 20. The retaining elements grip partially around the receptacle 34 so that they are detachable by a force impact due to a crash with a pedestrian. The assembly section 36 having an eye 38 extends in an essentially plate-like manner in approximately the center of the longitudinal extension of the receptacle 34. A screw with a rubber bushing can be extended through said eye for fastening to the motor vehicle.

Figure 3:
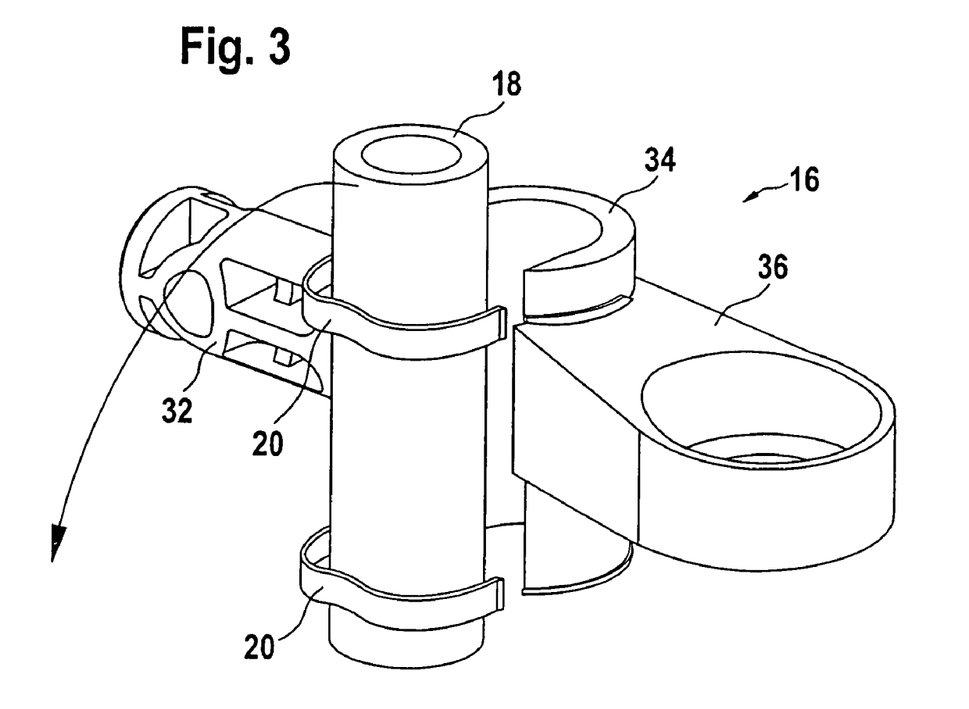
FIG. 3 A perspective representation of the portion of the support from FIG. 2 with a detached bearing.

FIG. 3 shows an exploded representation of the bearing holder 16, the bearing 18 and the retaining elements 20. The function of a windshield wiper device 10 in accordance with the invention is supposed to be explained in the following. If a force F (FIG. 2) acts on the wiper shaft 22 (FIG. 1), which is supported in the bearing 18, the retaining elements 20 that hold the bearing 18 in the receptacle 34 detach from the receptacle 34, whereby the wiper shaft 22, which is supported in the bearing 18, can tilt away in the direction of the arrow and can descend downward into the construction space of the windshield wiper device 10 in the motor vehicle. In this way, the risk of injury to a pedestrian making impact with the wiper shaft 22 is substantially reduced without the entire windshield wiper device 10 being destroyed by predetermined breaking points in an impact.

Figure 4:
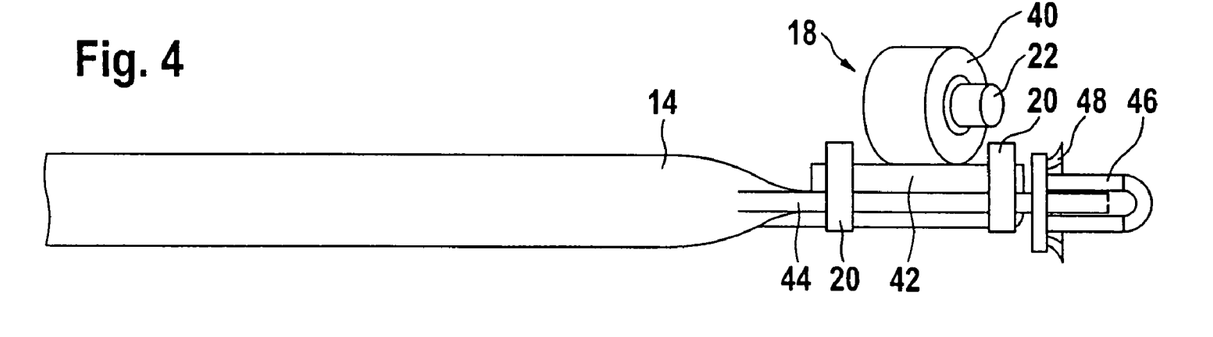
FIG. 4 A top view of a portion of a support with a bearing in one variation.

FIG. 4 shows a schematic representation of a variation of a windshield wiper device 10 in accordance with the invention. In this case, the bearing 18 includes a cylindrical bearing bush 40, which is welded to a plate 42. Alternatively, the bearing bush 40 and the plate 42 can naturally also be cast as a single piece, e.g., in a plastic injection molding process, or be manufactured in another manner. The tube 14 of the support 12 squeezed together on one end so that a flatten area 44 is created, which forms a second plate, on which the plate 42 of the bearing 18 is placed. Provided as retaining elements 20 that fix the plate 42 on the second plate 44 are in turn two bow-shaped clips made of metal, in particular spring steel, which grip around the plate 42 and the second plate 44 at least partially.

For fastening on the motor vehicle, the second plate 44 is extended beyond the area of the bearing 18 so that it can be inserted into a pocket-like mounting 46. This mounting 46 is cast as a single piece of plastic and is secured in a hole in the body of the motor vehicle by locking noses 48.

Figure 5:
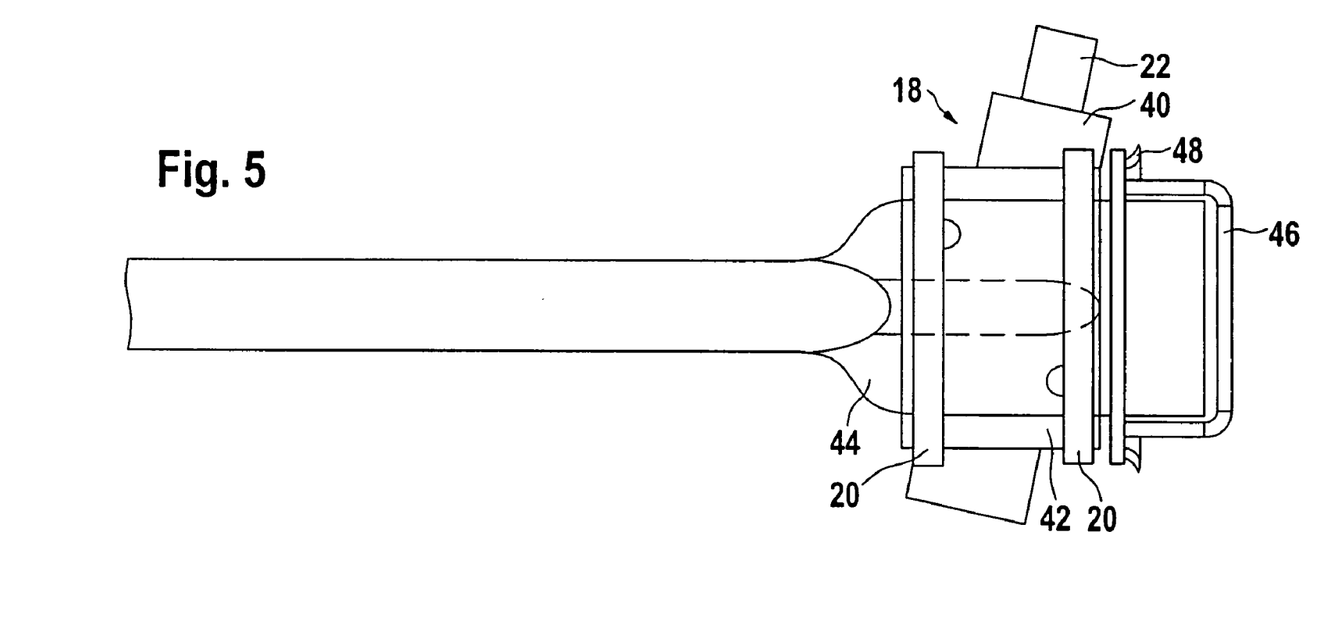
FIG. 5 A side view of the bearing and the support from FIG. 4.

FIG. 5 shows a side view of the bearing 18 with the end of the tube 14 of the support 12 from FIG. 4. The wiper shaft 22 is inserted in the bearing bush 40 of the bearing 18. The bearing bush 40 is firmly connected to the plate 42, which is placed on the second plate 44 that is created by the tube 14 being squeezed together and connected to the spring-like clip elements as retaining elements 20. The end of the tube 14 sticks into the pocket-like mounting 46, which has locking noses 48 for fastening to the body of the motor vehicle.

Figure 6:
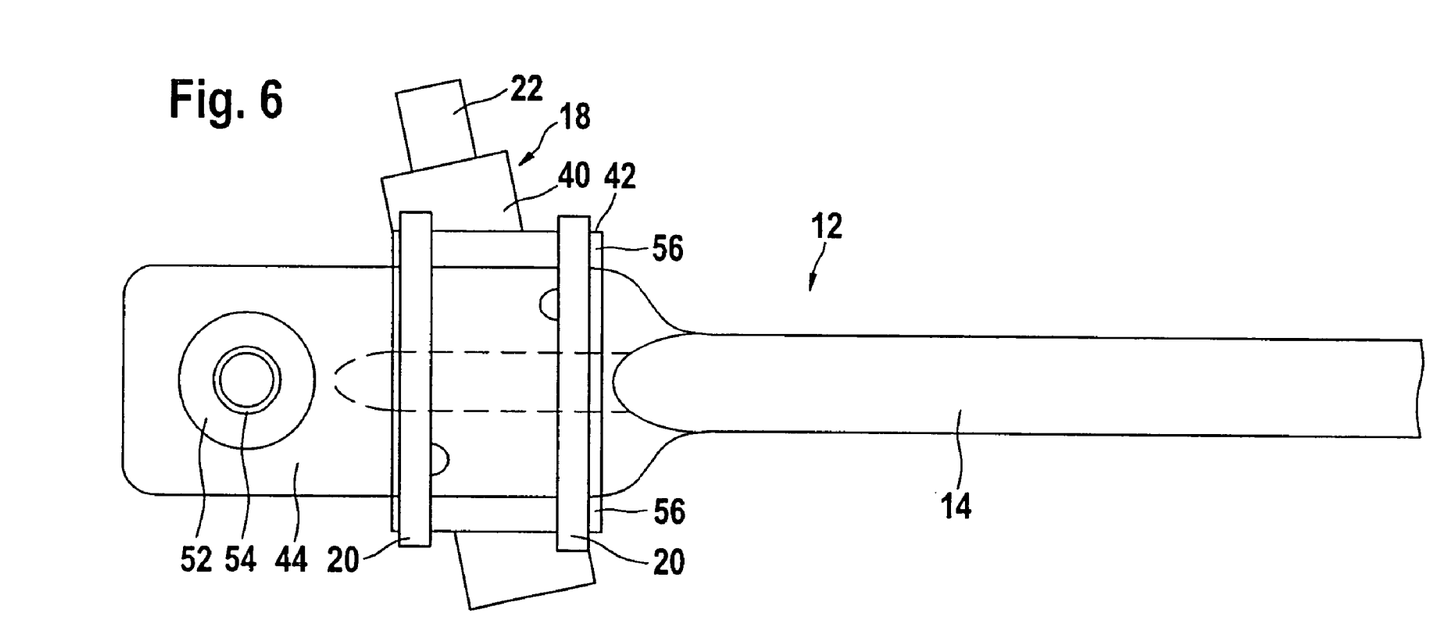
FIG. 6 Another variation of the support with the bearing from FIGS. 4 and 5.

FIG. 6 depicts a variation of the support 12 from FIGS. 4 and 5. Instead of the pocket-like mounting 46, the second plate 44 is extended further beyond the area of the plate 42 of the bearing 18. This outer area of the free end of the tube 14 has an eye 50, in which a damping element 52 with a bushing 54 is inserted. A screw for fastening to the body of the motor vehicle can be extended through this eye 50.

Figure 7:
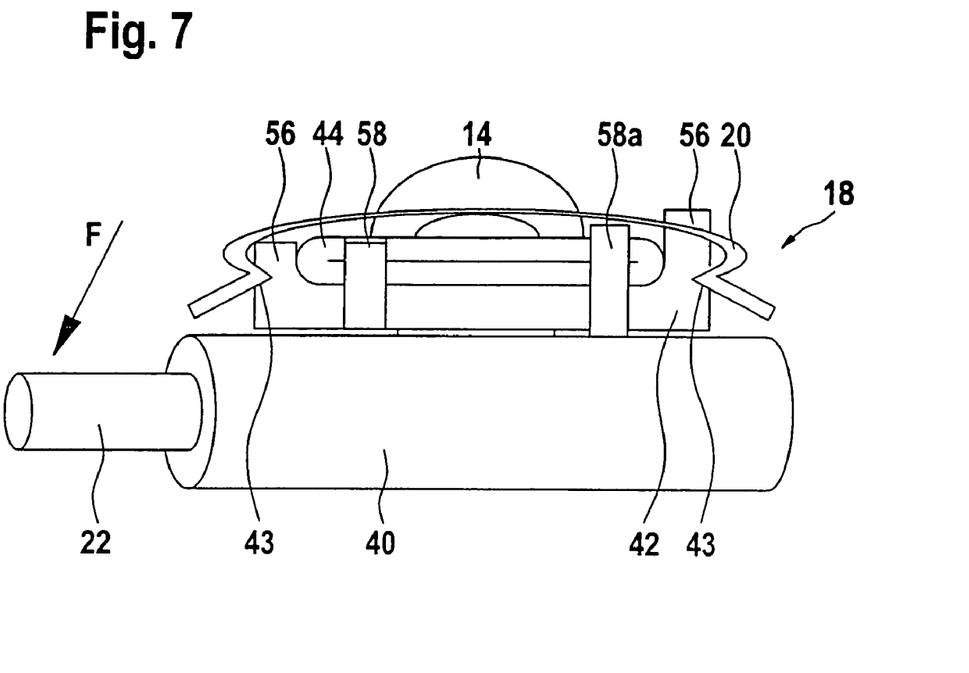
FIG. 7 Another variation of the fastening of the bearing on the support.

FIG. 7 depicts another variation of the bearing 18 from FIG. 6. Like FIG. 6, the plate 42 has side walls 56 for better guidance and these side walls extend in the direction of the second plate 44 and partially frame it. The stability of the connection is further improved because the side walls 56 nestle in this way around the edge of the second plate 44. In order to further improve the fixation of the bearing 18 on the support 12, guide pins 58, 58a also project out of the plate 42, and said guide pins engage in corresponding openings in the second plate 44. These guide pins 58, 58a have an essentially cylindrical form and extend from the side of the plate 42 facing away from the bearing bush 40 through the second plate 44. As an alternative, as guide pin 58a shows, a metal pin can also be inserted into the plate 42, which is fastened to the guide bush 40 and passes through plate 42 and the second plate 44. Fixing the plate 42 to the tube 14 is achieved via a strong bow spring as a retaining element 20, which extends between the two side walls 56 of plate 42 in a bridge-like manner beyond the second plate 44. For this, an elevated portion 60 can be arranged on the side of the plate 44 facing away from the bearing bush 40 in order to raise and adjust the spring tension of the bow spring 20, but the bow spring 20 can also have a corresponding concave curvature. The bow spring 20 engages in notches 43 on the side walls 56 for stabilization purposes.

If a force now acts, e.g., through the impact of a pedestrian on the wiper shaft 22, the bow spring 20 will slide off the side walls out of the notches 43 and the plate 42 will detach from the second plate 44. As a result, the wiper shaft 22 supported in the bearing bush 40 can recede into the interior of the motor vehicle. Within the motor vehicle it is expedient if the bearing bush 40 is arranged behind the tube 14 or the second plate 44 since the force from an impacting pedestrian normally acts on the wiper shaft 22 from the front and therefore laterally.

Figure 7A:
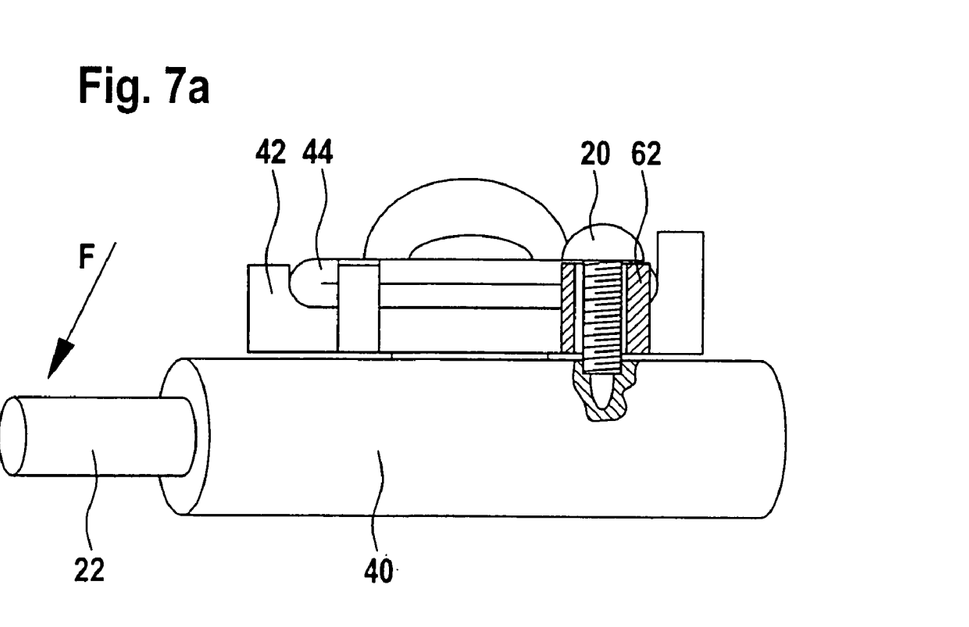
FIG. 7a A third variation of the fastening of the bearing on the support.

FIG. 7a depicts a variation of FIG. 7. The retaining element 20 in this case is embodied as a screw, which passes through the second plate 44 as well as the first plate 42 and is held in the bearing bush 40 over a small area. In addition, the screw 20 is positioned within the plate 42 and the second plate 44 via a separate screw bush 62. In the case of the impact of a pedestrian, a radial force acts on the wiper shaft, whereby the screw as retaining element 20 is torn out of the bearing bush. In this respect, the plate in this case is connected to the screw as retaining element 20 by a predetermined breaking point. Alternatively, the retaining element 20 itself can naturally also be provided with a predetermined breaking point and break off correspondingly in the case of an impact.

Figure 8:
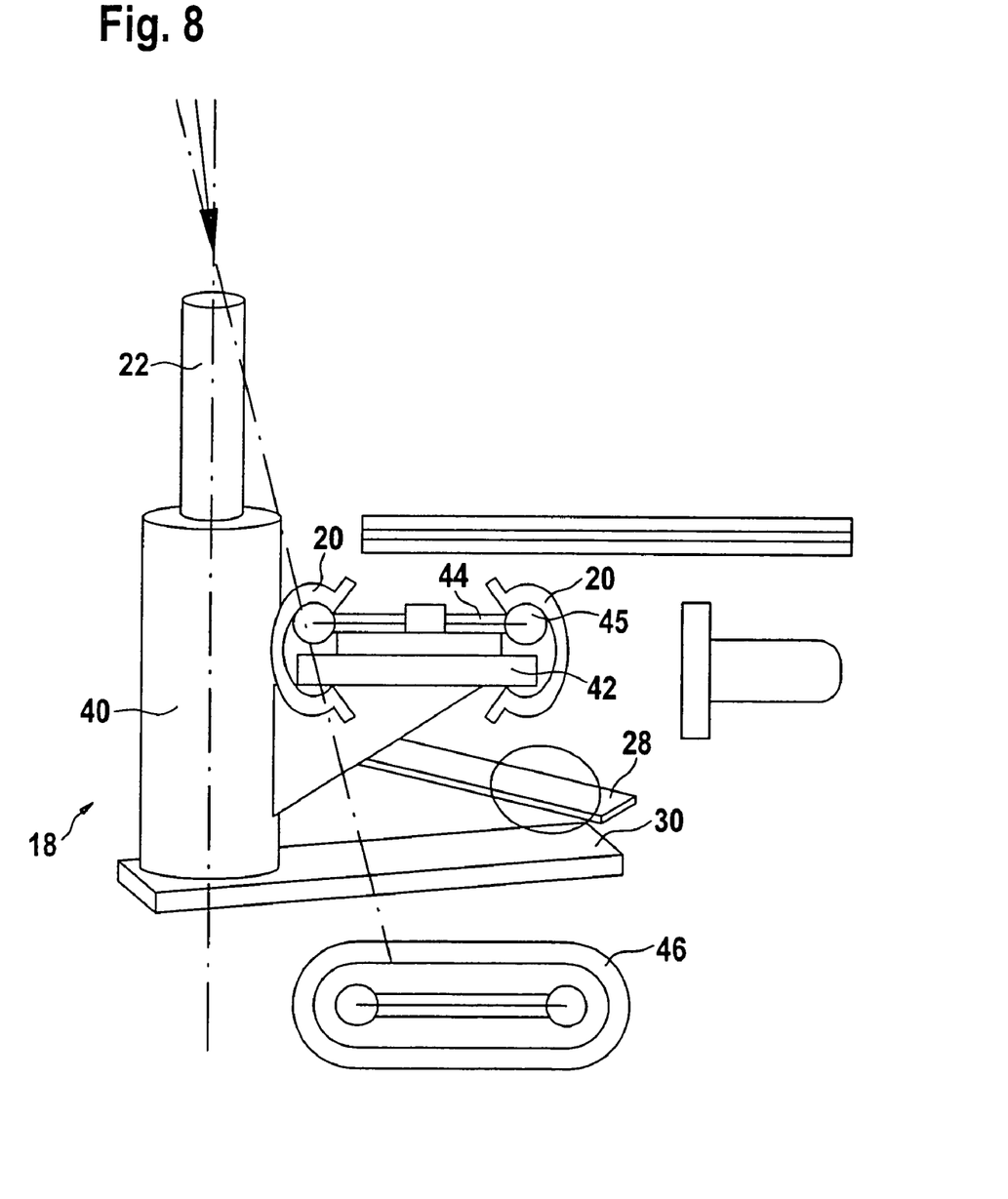
FIG. 8 A further variation of the bearing from FIG. 7 in a position installed in a vehicle.

FIG. 8 depicts a variation of the bearing 18 of a windshield wiper device in accordance with the invention from FIG. 7. The plate 42 is this case is not arranged parallel, but perpendicular to the bearing axis of the wiper shaft 22 or to the bearing bush 40. The retaining element 20 is embodied as a bow spring, which is guided between the plate 42 and the second plate 44 of the tube 14. In this connection, bending protuberances 45, which were formed on the edge of the second plate 44 when squeezing the tube 14 together, serve as a hook for the retaining element 20. As a supplement or an alternative, the plate 42 in this case can naturally also have one or more notches 43.

Figure 9:
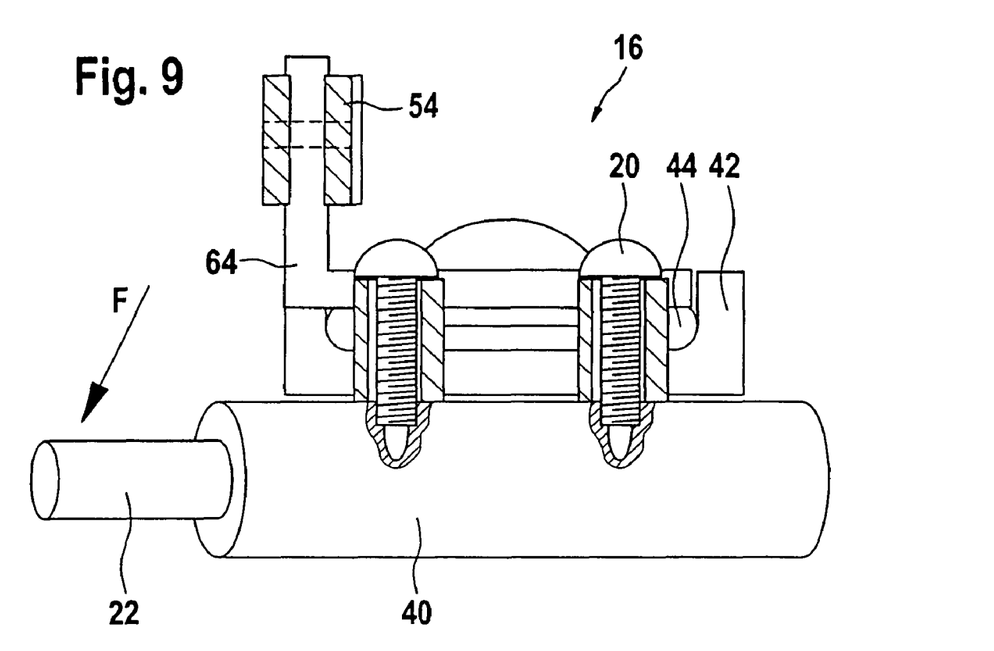

FIG. 9 shows a variation of the bearing 18 from FIG. 7a. The plate 42 is placed on second plate 44 of the tube 14 and fixed by two screws as retaining agents 20. The screws 20 also fix a fastening bow 64, which bears a bushing 54 for fastening to the motor vehicle. If a corresponding radial force F acts on the wiper shaft 22, the screws 20 are torn out of the bearing bush, wherein the bearing bush 40 with the wiper shaft 22 can descend into the interior of the body of the vehicle.

Figure 10:
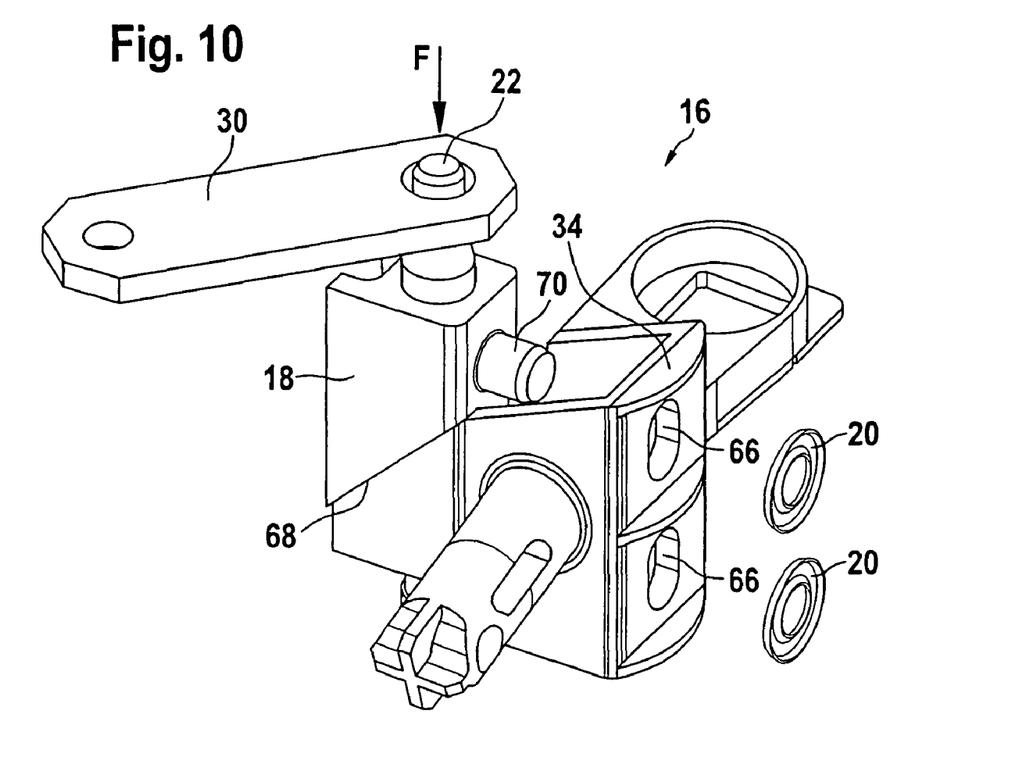
FIG. 10 A perspective representation of another variation of the fastening of the bearing on the support.

FIG. 10 depicts another variation of a bearing holder 16 of a windshield wiper device 10 in accordance with the invention. The bearing holder 16 in this case is manufactured as a single piece of plastic in an injection molding process or in an aluminum or zinc die-casting process. The receptacle 34 has an essentially U-shaped form in cross section and features two openings 66 on its base in the form of elongated holes. The bearing 18, which supports the wiper shaft 22, has an essentially rectangular parallelepiped form in cross section so that it can be accommodated with positive engagement in the receptacle 34. In addition, the bearing 18 has an inclined step 68, which cooperates with a step 68 arranged in the interior of the U-shaped receptacle 34 in such a way that an inclined plane is created on which the bearing 18 is able to slide as a guide in the interior of the U-shaped receptacle 34. If a force F acts on the wiper shaft 22 in the axial direction, then the bearing 18 slides out of the receptacle 34 on the inclined plane of the step 68. The bearing 18 has bolts 70 on its side facing the base of the receptacle 34, and said bolts project through the openings 66 of the base of the receptacle 34 in an assembled position. The bolts 70 are fixed there by means of speed nuts as retaining elements 20. If a force F now acts on the wiper shaft 22, the bearing 18 slides out of the U-shaped receptacle on the step 68, whereby the force must be overcome [in order to] slip the speed nuts over the bolts 70. The impact kinematics can be adjusted by appropriately selecting the speed nuts, the bolts and the angle of the step 68.

As an alternative, predetermined breaking elements can naturally also be used as retaining elements 20 instead of the speed nuts, e.g., pins projecting transversely through the bolts 70, screws or screw nuts. Also possible is an automatically engaging locking element, which breaks off for example when a maximum force is exceeded, thereby releasing the bolts 70. The bearing 18 is then inserted into the receptacle 34 during assembly and locks itself.

The invention claimed is:

1. Windshield wiper device (10), for a motor vehicle, comprising a support (12), on which at least one bearing (18) is arranged, which supports at least one wiper shaft (22), the bearing (18) and the wiper shaft (22) extending along an axis about which the wiper shaft is adapted to rotate within the bearing, characterized in that at least one retaining clip (20) detachably connects the bearing (18) to the support such that the bearing separates from the support in the event of an increased force on the wiper shaft due to impact with a pedestrian, the clip gripping around a portion of the support and a portion of the bearing to detachably connect the bearing to the support, the clip extending at least partially about the axis.

2. Windshield wiper device (10) according to claim 1, characterized in that the support (12) has a receptacle (34) to accommodate the bearing (18).

3. Windshield wiper device (10) according to claim 2, characterized in that the bearing (18) includes at least one tube.

4. Windshield wiper device (10) according to claim 3, characterized in that the clip (20) grips around the bearing (18) at least partially in a radial fashion.

5. Windshield wiper device (10) according to claim 2, characterized in that the receptacle (34) is C-shaped in cross section and has an interior, and in that the bearing (18) is inserted into the interior of the C-shaped receptacle.

6. Windshield wiper device (10) according to claim 5, characterized in that the clip grips partially around the receptacle such that the clip is detachable in the event of an impact with a pedestrian.

7. Windshield wiper device (10) according to claim 5, characterized in that the bearing is fixed in the receptacle by the at least one retaining clip and by a second retaining clip, the clips gripping partially around the receptacle such that the clips are detachable in the event of an impact with a pedestrian.

8. Windshield wiper device (10) according to claim 1, characterized in that the bearing (18) includes at least one tube.

9. Windshield wiper device (10) according to claim 1, characterized in that the clip (20) grips around the bearing (18) at least partially in a radial fashion.

10. Windshield wiper device (10) according to claim 1, characterized in that the support (12) includes a bearing holder (16) having a side wall defining a receptacle (34) receiving the bearing and a radial opening, and in that the at least one retaining clip (20) extends across the radial opening to detachably retain the bearing in the receptacle.

11. Windshield wiper device (10) according to claim 1, characterized in that the bearing is connected to the support by the at least one retaining clip and by a second retaining clip.

12. Windshield wiper device (10), for a motor vehicle, comprising a support (12), on which at least one bearing (18) is arranged, which supports at least one wiper shaft (22), characterized in that at least one retaining clip (20) detachably connects the bearing (18) to the support such that the bearing separates from the support in the event of an increased force on the wiper shaft due to impact with a pedestrian, characterized in that the support (12) has a receptacle (34) to accommodate the bearing (18), wherein the receptacle (34) is C-shaped in cross section and has an interior, wherein the bearing (18) is inserted into the interior of the C-shaped receptacle, and wherein the bearing is fixed in the receptacle by the at least one retaining clip and by a second retaining clip, the clips gripping partially around the receptacle such that the clips are detachable in the event of an impact with a pedestrian.

13. Windshield wiper device (10), for a motor vehicle, comprising a support (12), on which at least one bearing (18) is arranged, which supports at least one wiper shaft (22), characterized in that at least one retaining clip (20) detachably connects the bearing (18) to the support such that the bearing separates from the support in the event of an increased force on the wiper shaft due to impact with a pedestrian, in that the bearing (18) and the wiper shaft (22) extend along an axis, in that the support (12) includes a bearing holder (16) having a side wall defining a receptacle (34) receiving the bearing and a radial opening, and in that the clip extends across the radial opening to detachably retain the bearing in the receptacle.

14. Windshield wiper device (10) according to claim 13, characterized in that the at least one retaining clip (20) includes two retaining clips (20), each clip extending across the radial opening.

15. Windshield wiper device (10) according to claim 13, characterized in that the bearing (18) includes at least one tube.

16. Windshield wiper device (10) according to claim 13, characterized in that the receptacle (34) is C-shaped in cross section and has an interior, and in that the bearing (18) is inserted into the interior of the C-shaped receptacle.

17. Windshield wiper device (10) according to claim 16, characterized in that the bearing is fixed in the receptacle by the at least one retaining clip and by a second retaining clip, the clips gripping partially around the receptacle such that the clips are detachable in the event of an impact with a pedestrian.

* * * * *